(12) United States Patent
Xu et al.

(10) Patent No.: US 10,901,893 B2
(45) Date of Patent: Jan. 26, 2021

(54) MEMORY BANDWIDTH MANAGEMENT FOR PERFORMANCE-SENSITIVE IAAS

(71) Applicant: INTERNATIONAL BUSINESS MACHINES CORPORATION, Armonk, NY (US)

(72) Inventors: Cong Xu, Austin, TX (US); Karthick Rajamani, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 187 days.

(21) Appl. No.: 16/146,465

(22) Filed: Sep. 28, 2018

(65) Prior Publication Data
US 2020/0104256 A1    Apr. 2, 2020

(51) Int. Cl.
| | | |
|---|---|---|
| *G06F 9/46* | (2006.01) | |
| *G06F 12/02* | (2006.01) | |
| *G06F 9/50* | (2006.01) | |
| *G06F 13/16* | (2006.01) | |
| *G06F 9/455* | (2018.01) | |
| *G06F 9/54* | (2006.01) | |

(52) U.S. Cl.
CPC ...... *G06F 12/0284* (2013.01); *G06F 9/45558* (2013.01); *G06F 9/5016* (2013.01); *G06F 9/544* (2013.01); *G06F 12/023* (2013.01); *G06F 13/1678* (2013.01); *G06F 2009/45583* (2013.01); *G06F 2212/152* (2013.01)

(58) Field of Classification Search
CPC ............. G06F 12/0284; G06F 9/45558; G06F 9/5016; G06F 9/544; G06F 12/023; G06F 13/1678; G06F 2212/152; G06F 2009/45583
See application file for complete search history.

(56) References Cited

U.S. PATENT DOCUMENTS

| | | | | |
|---|---|---|---|---|
| 8,352,608 B1 * | 1/2013 | Keagy | ....................... | G06F 8/63 |
| | | | | 709/226 |
| 8,468,251 B1 * | 6/2013 | Pijewski | ............... | G06F 9/5072 |
| | | | | 709/226 |
| 8,645,640 B2 | 2/2014 | Floyd et al. | | |
| 8,650,367 B2 | 2/2014 | Floyd et al. | | |

(Continued)

OTHER PUBLICATIONS

Yun, H. et al.;"Memory Bandwidth Management for Efficient Performance Isolation in Multi-Core Platforms", IEEE Transactions on Computers, vol. 65, Issue 2, Feb. 1, 2016.

(Continued)

*Primary Examiner* — Adam Lee
(74) *Attorney, Agent, or Firm* — Daniel R. Simek

(57) ABSTRACT

Memory bandwidth allocations for a plurality of tenants on a processor socket may be managed by determining a total memory bandwidth for the processor socket, determining a respective share of the total memory bandwidth for each tenant, and determining a respective dynamic memory bandwidth budget for the each tenant. The memory bandwidth allocations may be controlled based on the determined respective dynamic memory bandwidth budgets, wherein the each respective dynamic memory bandwidth budget supports utilizing the each respective share and supports sharing unused memory bandwidth of the each respective tenant with a different tenant included in the plurality of tenants.

18 Claims, 10 Drawing Sheets

(56) References Cited

U.S. PATENT DOCUMENTS

| | | | | |
|---|---|---|---|---|
| 8,966,464 B1* | 2/2015 | Christopher | ........ | G06F 11/0712 717/166 |
| 9,027,024 B2 | 5/2015 | Mick et al. | | |
| 9,686,129 B2* | 6/2017 | Cai | .................... | H04L 41/0803 |
| 9,754,122 B1* | 9/2017 | Christopher | ........ | G06F 21/6218 |
| 9,817,607 B1* | 11/2017 | Harvey | .................. | G06F 3/061 |
| 9,842,075 B1* | 12/2017 | Davis | .................... | G06F 13/385 |
| 10,389,697 B1* | 8/2019 | Kulkarni | ............... | H04W 12/08 |
| 2005/0235285 A1* | 10/2005 | Monasterio | ........... | G06F 9/4843 718/100 |
| 2006/0069525 A1* | 3/2006 | Nalawadi | .............. | G06F 1/3203 702/136 |
| 2007/0079072 A1* | 4/2007 | Collier | ................. | G06F 12/082 711/133 |
| 2008/0103634 A1* | 5/2008 | Santos | .................... | G05D 23/19 700/299 |
| 2009/0248976 A1* | 10/2009 | Rotithor | ................ | G06F 9/5094 711/113 |
| 2010/0218194 A1* | 8/2010 | Dallman | ............... | G06F 9/5044 718/104 |
| 2011/0231697 A1* | 9/2011 | Berke | .................... | G06F 11/004 714/3 |
| 2011/0276972 A1* | 11/2011 | Chung | ................. | G06F 9/5016 718/103 |
| 2011/0276973 A1* | 11/2011 | Chung | ................ | G06F 13/1663 718/103 |
| 2011/0276974 A1* | 11/2011 | Chung | ................ | G06F 13/1689 718/103 |
| 2012/0079492 A1* | 3/2012 | Chambliss | ............ | G06F 9/5083 718/104 |
| 2012/0110156 A1* | 5/2012 | Guru | ..................... | H04L 67/125 709/223 |
| 2012/0191921 A1* | 7/2012 | Shaeffer | .............. | G06F 13/4022 711/149 |
| 2013/0254407 A1* | 9/2013 | Pijewski | ........... | H04L 29/08189 709/226 |
| 2013/0346533 A1* | 12/2013 | Agrawal | ............. | H04L 29/0854 709/213 |
| 2014/0280970 A1* | 9/2014 | Pijewski | ............. | H04L 41/0896 709/226 |
| 2014/0281311 A1* | 9/2014 | Walker | ................... | G06F 12/122 711/162 |
| 2014/0330936 A1* | 11/2014 | Factor | ................. | H04L 63/0281 709/219 |
| 2015/0103646 A1* | 4/2015 | Tourrilhes | ............. | H04L 47/125 370/229 |
| 2015/0235308 A1 | 8/2015 | Mick et al. | | |
| 2016/0285970 A1* | 9/2016 | Cai | .......................... | G06F 13/28 |
| 2016/0330138 A1* | 11/2016 | Thomason | .......... | G06F 9/45558 |
| 2016/0378149 A1* | 12/2016 | Kam | ....................... | G11C 7/04 713/320 |
| 2017/0031698 A1* | 2/2017 | Mathews | ............ | G06F 9/45558 |
| 2018/0084081 A1* | 3/2018 | Kuchibhotla | ......... | H04L 47/826 |
| 2018/0136971 A1 | 5/2018 | Dong et al. | | |
| 2018/0260330 A1* | 9/2018 | Felten | ................... | G06F 9/5016 |
| 2018/0278675 A1* | 9/2018 | Thayer | ...................... | G06F 9/46 |
| 2019/0041960 A1* | 2/2019 | Guim Bernat | ...... | H04L 41/5051 |
| 2019/0042339 A1* | 2/2019 | Doshi | ................. | G06F 9/45558 |
| 2019/0042434 A1* | 2/2019 | Gough | .................... | H04L 49/70 |
| 2019/0044849 A1* | 2/2019 | Ganguli | ............. | G06F 16/2453 |
| 2019/0068509 A1* | 2/2019 | Hyatt | .................. | G06F 11/3442 |
| 2019/0081929 A1* | 3/2019 | Cudak | .................... | H04L 63/06 |
| 2019/0103687 A1* | 4/2019 | Murtagian | ......... | H01R 13/2442 |
| 2019/0108111 A1* | 4/2019 | Levin | .................. | G06F 13/4295 |
| 2019/0332437 A1* | 10/2019 | Van Hoof | ........... | G06F 16/9024 |
| 2019/0354388 A1* | 11/2019 | Mitra | ..................... | G06N 20/00 |

OTHER PUBLICATIONS

AAfija, B. et al, "Rational Network Bandwidth Distribution in IaaS", IJESC, vol. 8, Issue No. 3, 2018.

Anonymous, "Intelligent System and Method for Managing Network Bandwidth of an Enterprise by Providing Class of User Services Based on Analytics Done on the Network Bandwidth Allocation and Consumption" IPCOM000247428D, Sep. 7, 2016, 6 pages.

Anonymous, "System and Method for Network Load Balancing in a Cloud Environment" IPCOM000240937D, Mar. 12, 2015, 5 pages.

Anonymous, "A "Cloud Sourcing" System that Recommends the Pptimal Resource Configuration Based on a Cloud Workload's Attributes" IPCOM000236263D, Apr. 15, 2014.

Lo et al. "Heracles: Improving Resource Efficiency at Scale" 2015 ACM/IEEE 42nd Annual International Symposium on Computer Architecture.

Andrew H. et al., "Introduction to Memory Bandwidth Allocation" Intel, Mar. 12, 2019.

* cited by examiner

MEMORY BANDWIDTH MANAGEMENT FOR PERFORMANCE-SENSITIVE IAAS

BACKGROUND

Computer processors are increasingly utilized by several tenants in resource-sharing environments. For example, in an Infrastructure as a Service (IaaS) environment, multiple tenants may utilize a processor socket concurrently.

SUMMARY

According to one aspect, memory bandwidth allocations for a plurality of tenants on a processor socket may be managed by determining a total memory bandwidth for the processor socket, determining a respective share of the total memory bandwidth for each tenant, and determining a respective dynamic memory bandwidth budget for the each tenant. The memory bandwidth allocations may be controlled based on the determined respective dynamic memory bandwidth budgets, wherein the each respective dynamic memory bandwidth budget supports utilizing the each respective share and supports sharing unused memory bandwidth of the each respective tenant with a different tenant included in the plurality of tenants.

A method, system, and computer program product are provided for memory bandwidth management.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1A:
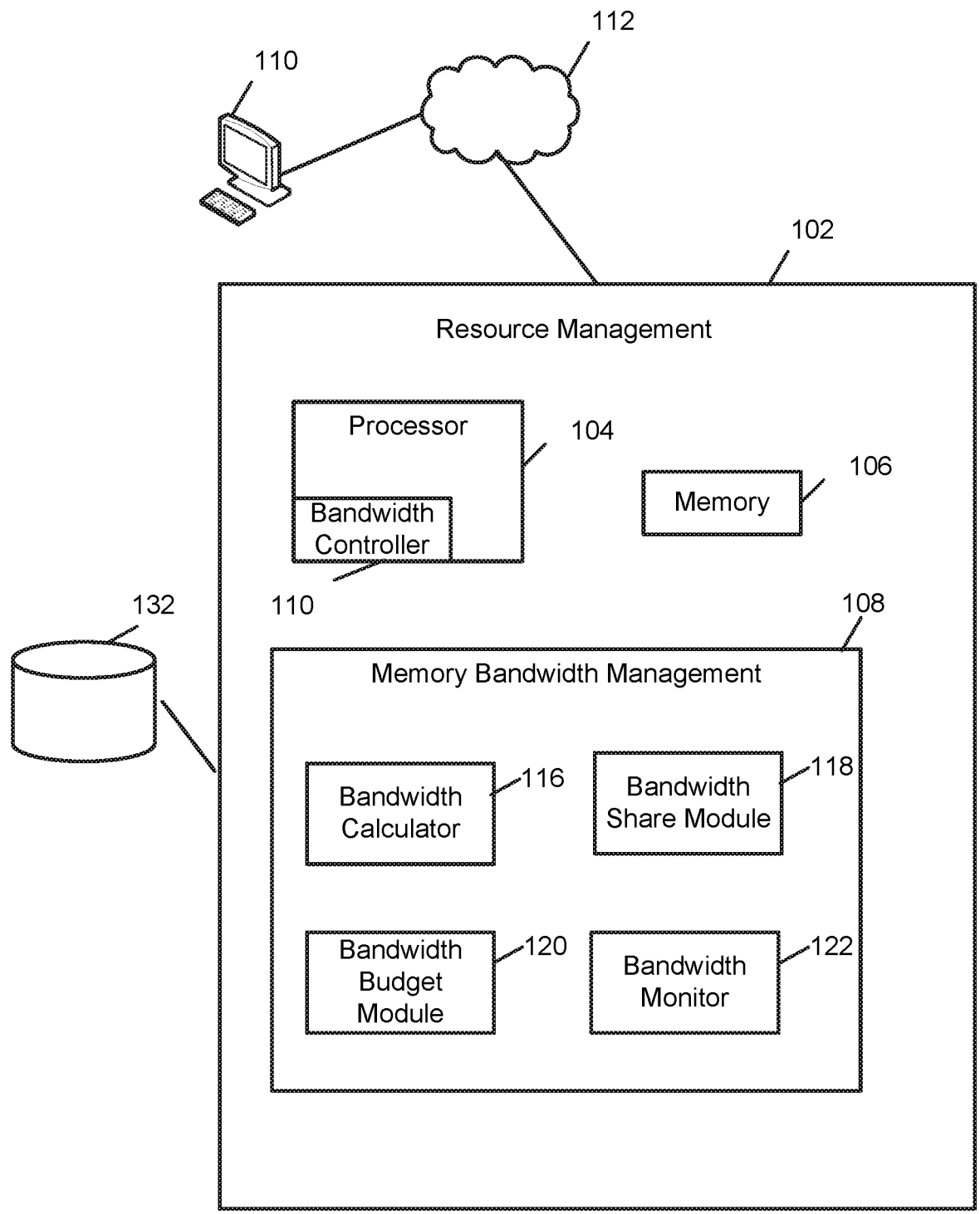
FIG. 1A is a schematic diagram of an embodiment of a system for resource management.

The present disclosure relates to memory bandwidth management. More specifically, the present disclosure relates to memory bandwidth management for performance-sensitive Infrastructure as a Service (IaaS). In the context of the present disclosure, IaaS may refer to a form of cloud computing that provides virtualized computing resources over a network (e.g., the Internet).

As an example, computer processors (e.g., central processing units (CPUs)) are increasingly utilized by several tenants in resource-sharing environments. For example, in an Infrastructure as a Service (IaaS) environment, multiple tenants may utilize a processor socket concurrently. Shared memory channels on a socket may cause interference among tenants (running in the same processor socket) in the multi-tenant cloud. For example, memory bandwidth (MB) may be affected by noisy neighbors. As another example, shared memory channels may cause inconsistent performance for some tenants.

Current computer processors may include multiple cores on a chip, which may be connected to a motherboard via a socket. The chip (e.g., the cores) may access off-chip memory (e.g., volatile memory, dynamic random-access memory (DRAM)) via multiple memory channels. In the context of the present disclosure, memory bandwidth (MB) refers to the rate at which the memory may be read or written (e.g., via the memory channels). For example, a processor may be attached to specific dedicated memory channels, and memory bandwidth thus refers to the rate at which the processor is able to read and write the memory through these memory channels, typically measured in gigabytes per second (GB/sec). For example, a memory channel bandwidth may be in a range of approximately 10 GB/sec.

Thus, a processor may have multiple memory channels. With regard to a processor socket chip, all cores of the processor may have access to all memory channels available to the processor chip. Memory bandwidth for this scenario refers to the rate at which (i.e., how fast) the compute cores within the processor socket may access the off-chip memory attached to the processor socket.

An example memory bandwidth management technique may use pre-defined steps to throttle bandwidth. However, with such a technique, the output may be workload dependent. Further, it may be difficult, or impossible, to determine which step should be used in advance. Additionally, the relationship between the pre-defined steps and the corresponding outputs is not linear, which in turn may make it difficult to apply.

Another example memory bandwidth management technique may adopt static configuration and may not be not work-conserving. Such an example technique may result in a waste of resources if some tenants are idle or not memory-intensive but still have exclusive usage of their memory bandwidth. Further, such an example technique may result in sub-optimal performance if certain tenants do not have enough memory bandwidth to fit their traffic.

Example techniques discussed herein may manage memory bandwidth for tenants of multiple compute cores all sharing memory channels to the off-chip memory. In some embodiments, the memory bandwidth may be partitioned so that work performed in any of the multiple compute cores of the processor has a rightful share of access to the shared resource, i.e., memory bandwidth.

Example techniques discussed herein may advantageously maintain performance isolation among memory intensive tenants while improving the memory bandwidth utilization. In some embodiments, performance isolation may be maintained by limiting each tenant's usage with low level knobs for controlling memory bandwidth and dynamically allocating bandwidth among tenants to maximize overall utilization of the memory bandwidth resource.

For example, FIG. 1A shows an example embodiment of a system for resource management. As shown in the embodiment of FIG. 1A, resource management system 102 includes a processor 104, a memory 106, and a memory bandwidth management system 108. Processor 104 includes a bandwidth controller 110. For example, memory bandwidth management system 108 may manage memory bandwidth allocations for a plurality of tenants on a processor socket. For example, the plurality of tenants may be represented as tenants ($T_1, T_2, \ldots, T_n$). For example, memory 106 may include a computer readable storage medium, as discussed further below. For example, system 102 may communicate with a device 110 via a network 112. In some embodiments, network 112 may be a wide area network ("WAN"), e.g., the Internet. In other embodiments, network 112 may be a local area network ("LAN"). For example, in a more remote location far from a metropolitan area, the Internet may not be available. In yet other embodiments, network 112 may be a combination of a WAN and a LAN. For example, device 110 may provide an interface for a user of an IaaS environment.

As shown in FIG. 1A, memory bandwidth management system 108 may include a bandwidth calculator module 116, a bandwidth share module 118, a bandwidth budget module 120, a bandwidth monitor module 122. While these components are shown as boxes with a processor and a memory in FIG. 1A, one skilled in the art will understand that the functionality may be stored on one or more chips. A repository 132 may store data that may be processed by system 102.

Bandwidth calculator module 116 may determine a total memory bandwidth for the processor socket. For example, bandwidth calculator module 116 may determine a total memory bandwidth for a plurality of memory channels for the processor and an off-chip memory (e.g., memory 106). For example, the off-chip memory may include volatile memory (e.g., DRAM).

Bandwidth share module 118 may determine a respective share of the total memory bandwidth for each tenant of the plurality of tenants. For example, bandwidth share module 118 may determine an appropriate, or rightful, share of the total memory bandwidth B ($B_1, B_2, \ldots, B_n$) for each tenant T ($T_1, T_2, \ldots, T_n$).

Bandwidth budget module 120 may determine a respective dynamic memory bandwidth budget D ($D_1, D_2, \ldots, D_n$) for the each tenant T ($T_1, T_2, \ldots, T_n$). Bandwidth monitor module 122 may monitor, or track, bandwidth usage over time.

Bandwidth controller 110 may control the memory bandwidth allocations based on the determined respective dynamic memory bandwidth budgets. In some embodiments, the each respective dynamic memory bandwidth budget supports utilizing the each respective share and supports sharing unused memory bandwidth of the each respective tenant with a different tenant included in the plurality of tenants. In this way, currently unused memory bandwidth may advantageously be dynamically allocated for more efficient usage by the plurality of tenants. In some embodiments, an enforcement of the each dynamic memory bandwidth budget $D_i$ may utilize throttle controls for memory bandwidth.

In some embodiments, throttle controls may be designated for each processor core used by the each tenant $T_i$.

In some embodiments, bandwidth monitor module 122 may monitor memory bandwidth utilization for the each tenant T ($T_1, T_2, \ldots, T_n$) to determine a current utilization U ($U_1, U_2, \ldots, U_n$). In some embodiments, bandwidth controller 110 may adjust throttle controls utilizing an iterative feedback loop.

Figure 1B:
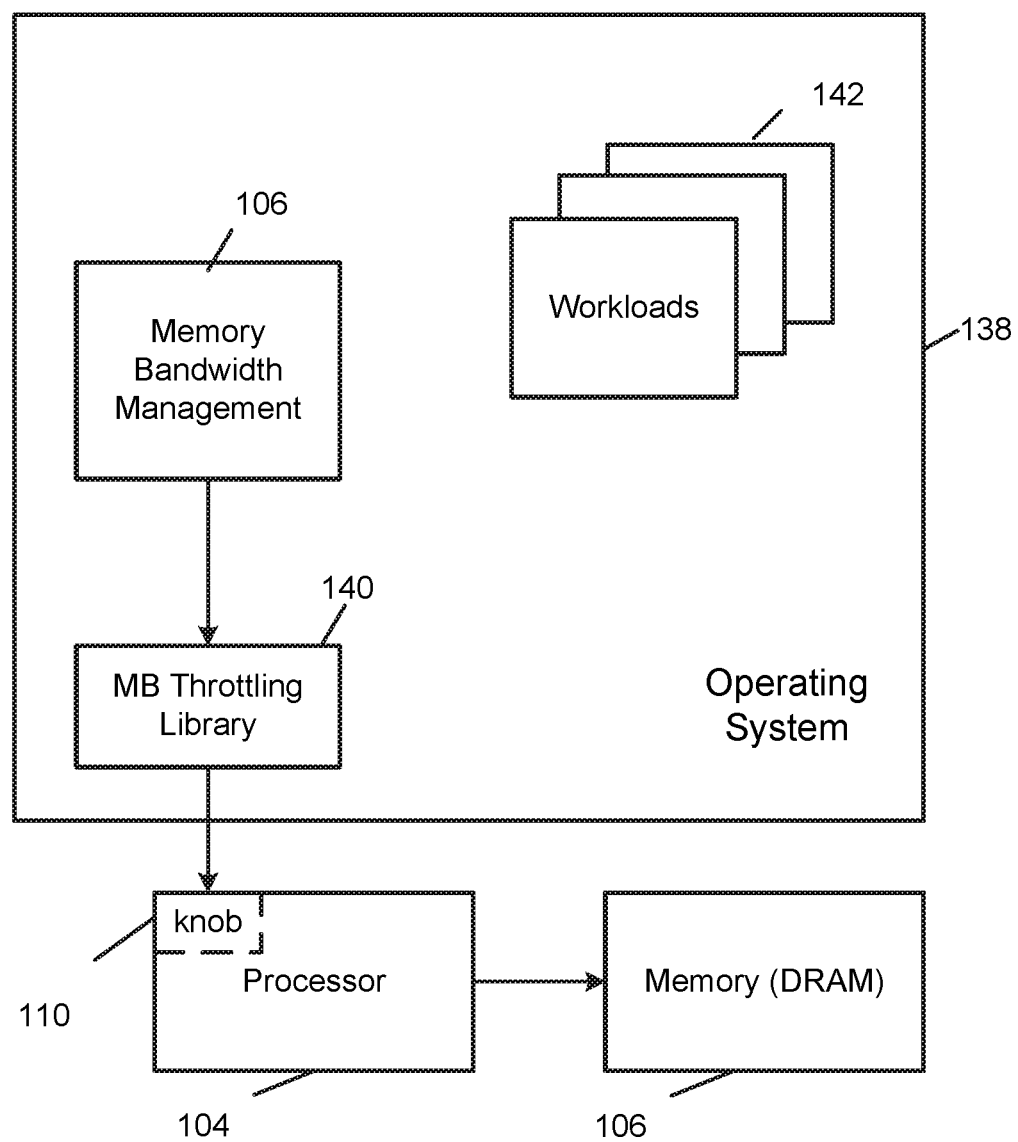
FIG. 1B is a schematic diagram of an embodiment of a system for memory bandwidth management.

FIG. 1B is a schematic diagram of an embodiment of a system for memory bandwidth management. As shown in FIG. 1B, an operating system (OS) 138 includes memory bandwidth management system 106, workloads 142, and a memory bandwidth throttling library 140. As shown in FIG. 1B, memory bandwidth throttling library 140 communicates with a knob 110 on processor 104 to control the memory access rate for processor 104 with memory 106. In some embodiments, knob 110 may include throttling functionality. For example, the rate may be controlled by either adding additional delay to each memory request (e.g., INTEL XEON processor) or by limiting the issued request number per window (IBM POWER8 processor, e.g., 10 k requests per 100 ms).

In some embodiments, knob 110 may include registers with control values written to the registers by memory bandwidth throttling library 140. For example, knob 110 may include one or more special purpose registers (e.g., memory control registers) with values written to them by processor 104 from memory bandwidth throttling library 140. For example, bits set in a register may denote control parameters for the memory controller. Writing of the bits may thus mean the system is to give only particular amounts of bandwidth to particular tenants (or cores). Depending on the mechanism, the bits may be interpreted in different ways. For example, different throttling mechanisms may be used for different processor environments (e.g., INTEL XEON, IBM POWER8). In such different processor environments, different registers may be used and different values in the registers may be interpreted differently. In some embodiments, once the control values are loaded into the registers (e.g., by throttling library 140), hardware logic (e.g., in processor 104 and a memory controller) may execute in accordance with the set bits to implement knob 110 control. Thus, the values in the register(s) may control the memory controller.

In different environments, different knobs are possible. For example, in an INTEL XEON environment, delay may be added (e.g., change an amount of delay to change the extent of throttling). For example, in a POWER8 environment, there may be at least two different values used, one for a window size and one for a number of requests permitted in that window.

In some embodiments, memory bandwidth management system 106 may run as a daemon in the host OS or hypervisor.

Figure 2:
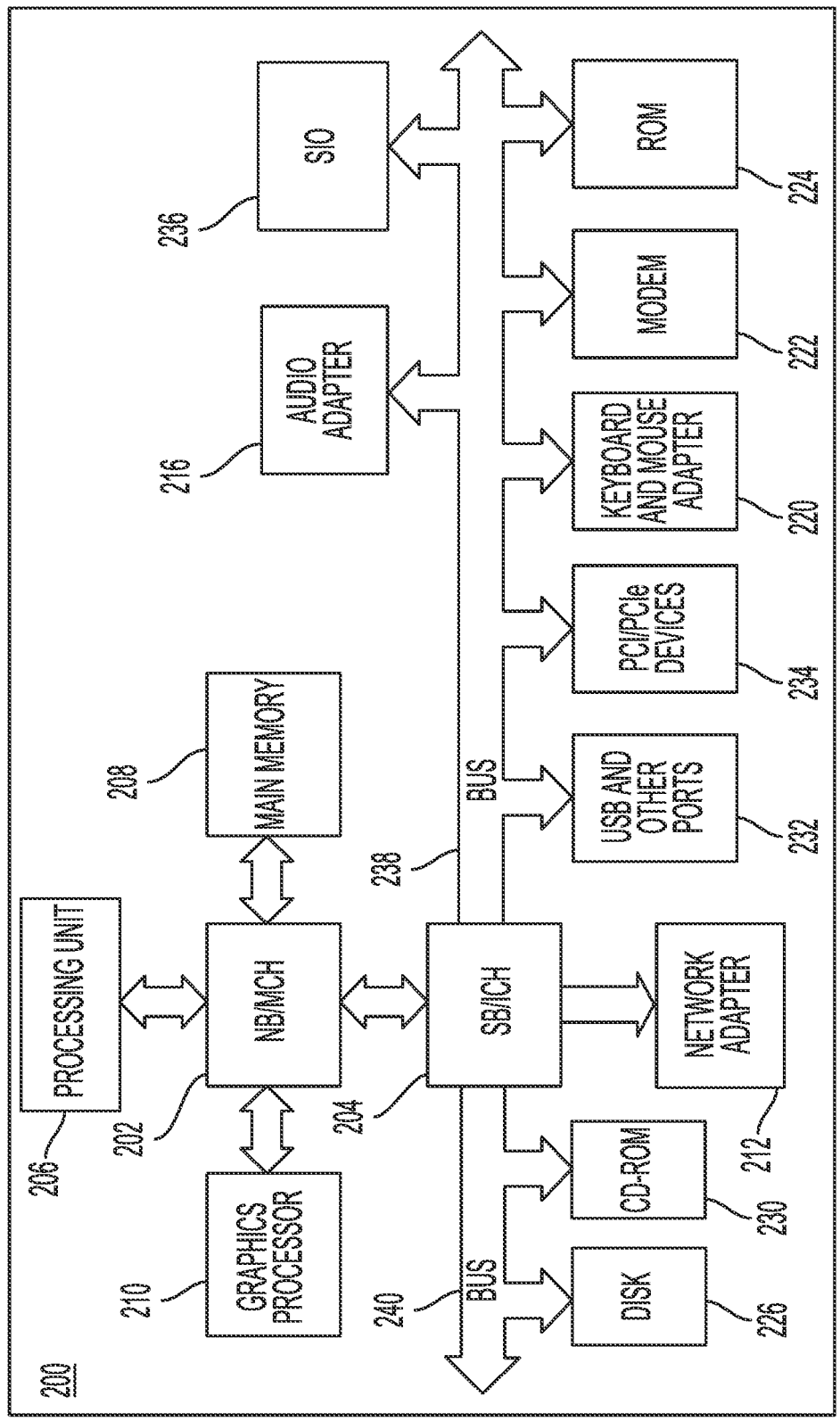
FIG. 2 is a schematic diagram of an embodiment of a hardware system for memory bandwidth management.

With reference to FIG. 2, this figure depicts a block diagram of a data processing system in which illustrative embodiments may be implemented. Data processing system 200 is an example of a computer, such as servers, or clients, or another type of device in which computer usable program code or instructions implementing the processes may be located for the illustrative embodiments.

Data processing system 200 is also representative of a data processing system or a configuration therein, in which computer usable program code or instructions implementing the processes of the illustrative embodiments may be located. Data processing system 200 is described as a computer only as an example, without being limited thereto. Implementations in the form of other devices may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX®. (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™. (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

Some examples of memory bandwidth throttling may be workload dependent. As examples, static memory bandwidth throttling may be realized with INTEL MEMORY BANDWIDTH ALLOCATION (MBA) or IBM POWER MEMORY THROTTLE (PMT). For example, MBA allows core to MB-QoS class mapping, which may be realized as appending specific delay between cores and memory. The MBA technique may be implemented as a class library, which may be leveraged via a user interface (UI).

For example, PMT may allow setting a number of memory requests for a window (e.g., 10 s).

For example, a specific delay on x86 may be determined by ten pre-defined steps. Management granularity is thus coarse (ten throttling rates), and throttling may be nonlinear.

It may be possible to improve the performance of memory intensive tenants while maintaining high resource utilization. For example, the memory bandwidth value may be used as a throttling budget instead of pre-defined steps. A sub-interval value may be defined to adjust the MBA settings. Execution monitoring may be used to determine two successive steps covering budget. A combination of steps may be calculated to achieve the throttling budget.

For example:

(1) Monitor for two successive steps down and up where $$bw(\text{down}) \leq \text{budget} \leq bw(\text{up})$$

(2) Compute the time share for the down step and up step. Share_down indicates # of sub-intervals using down step in each monitoring interval. Share_up indicates # of sub-intervals using up step.

STEPS=# of sub-intervals per monitoring interval $$\text{granularity}=(bw(\text{up})-bw(\text{down}))/\text{STEPS} \quad (3)$$

$$\text{share\_up}=(\text{budget}-bw(\text{down}))/\text{granularity} \quad (4)$$

$$\text{share\_down}=\text{STEPS}-\text{share-up} \quad (5)$$

In this example, granularity may determine the accuracy of throttling. As an example, if a budget is x, an observed bandwidth range may be (x−granularity, x+granularity).

Figure 3:
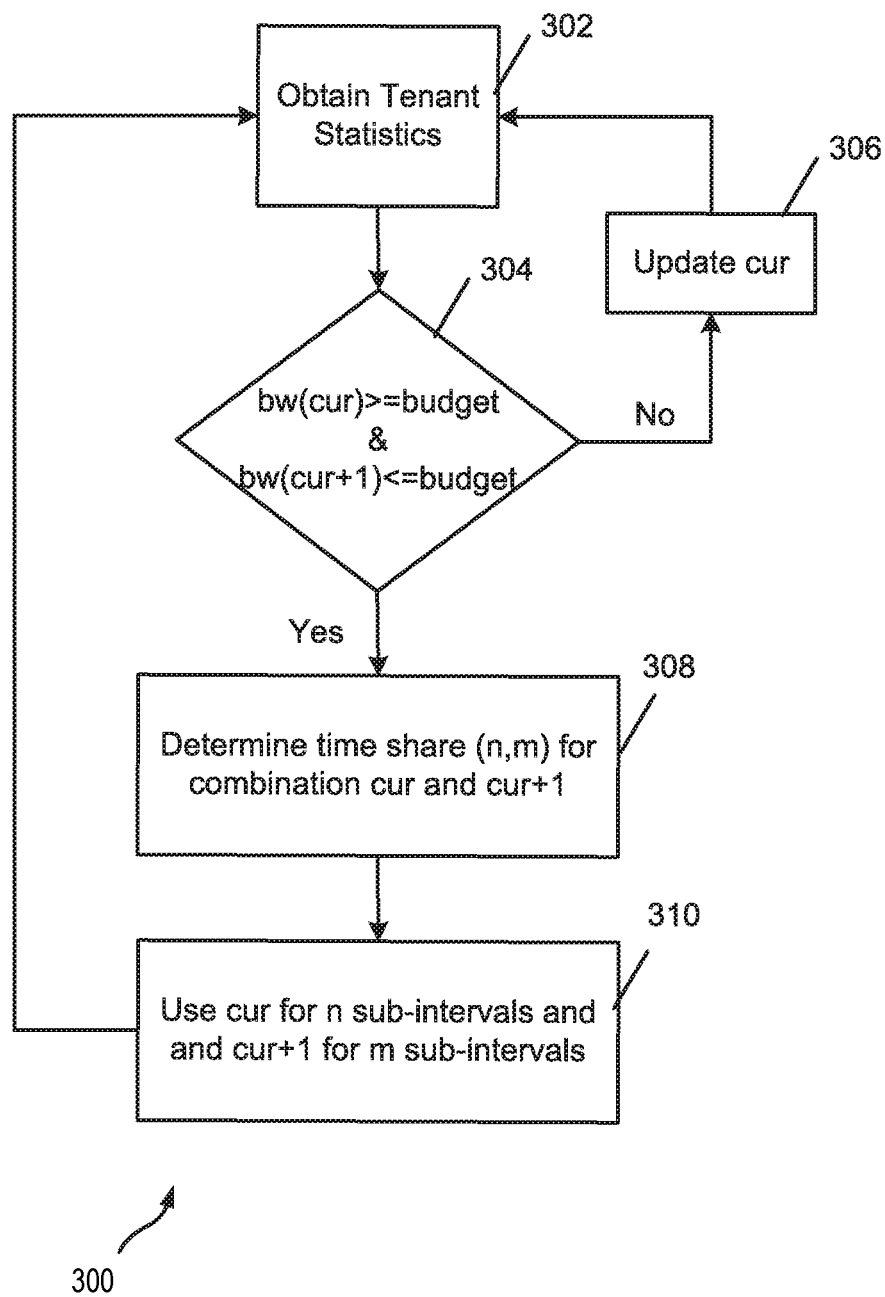
FIG. 3 is a flowchart of an example of memory bandwidth management.

FIG. 3 is a flowchart 300 of an example of memory bandwidth management. For example, FIG. 3 may represent a bandwidth capping solution for MBA. As shown in FIG. 3, at step 302, tenant statistics may be obtained for every tenant. At step 304, using monitoring, it may be determined whether the bandwidth of a current step (throttle setting) is ≥budget and the bandwidth of the next step (temporally) is ≤budget. If not, then the current step is updated and control returns to step 302. Otherwise, at step 308, time share (n, m) is calculated for the current step and the next step. At step 310, it is determined to use the current step for n sub-intervals and the next step for m sub-intervals. The throttle setting for the current step is applied to all cores of the tenant. Control is returned to step 302.

As another example, controller input and output may be related linearly. For example, u may represent a control value (input), where u has a fixed range according to the specific workload. For example, o may denote the observed memory bandwidth in the monitor. The slope k may be calculated as $$k = \frac{\Delta o}{\Delta u}$$

where $\Delta o$ is $o_{t2} - o_{t1}$ and $\Delta u$ is $u_{t2} - u_{t1}$

It may be possible to calculate the desired input with the slope rate k for a specific workload, for example, as $$u_{desired} = u_{t1} + k^*(budget - o_{t1})$$

Figure 4:
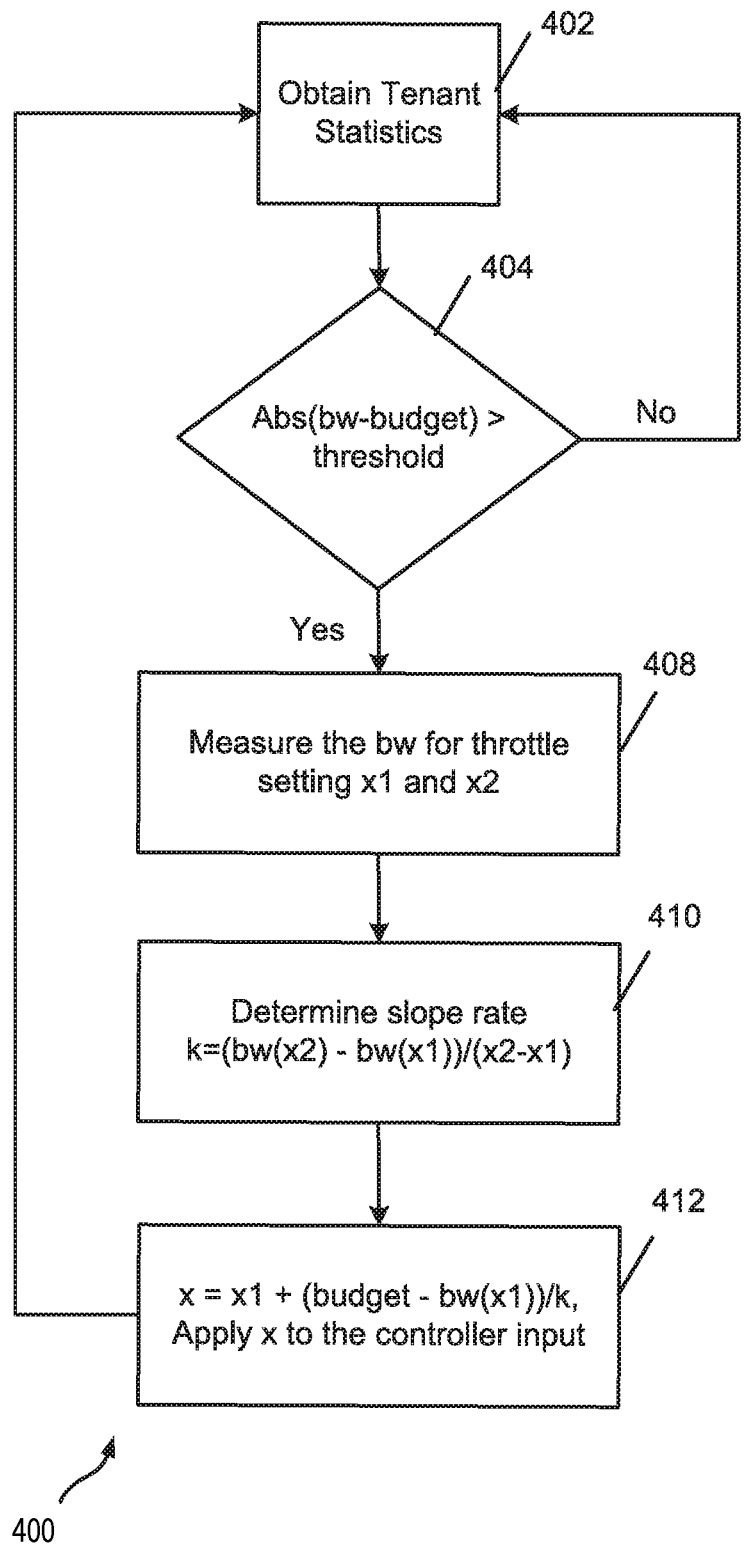
FIG. 4 is a flowchart of an example of memory bandwidth management.

FIG. 4 is a flowchart 400 of an example of memory bandwidth management. For example, FIG. 4 may represent a bandwidth capping solution for PMT. As shown in FIG. 4, at step 402, tenant statistics may be obtained for every tenant. At step 404, it may be determined whether the difference between the bandwidth and the budget is greater than a predetermined threshold value. If not, then control returns to step 402. Otherwise, at step 408, the bandwidth is measured for throttle settings x1 and x2. At step 410, a slope rate is determined as $$k = (bw(x2) - bw(x1))/(x2 - x1)$$

At step 412, x is determined as $$x = x1 + (budget - bw(x1))/k$$

and is applied to the controller input. The throttle setting may be applied to all cores of the tenant if performed on a per tenant basis. This may be performed separately for each core of the tenant using a per core budget, which may be based on relative bandwidth usage among the cores of the tenant.

In some embodiments, a bandwidth distribution may be determined to maximize utilization of the resource. For example, the memory bandwidth budget of each tenant may be dynamically adjusted according to each tenant's workloads to maximize the overall utilization of the memory bandwidth.

Figure 5:
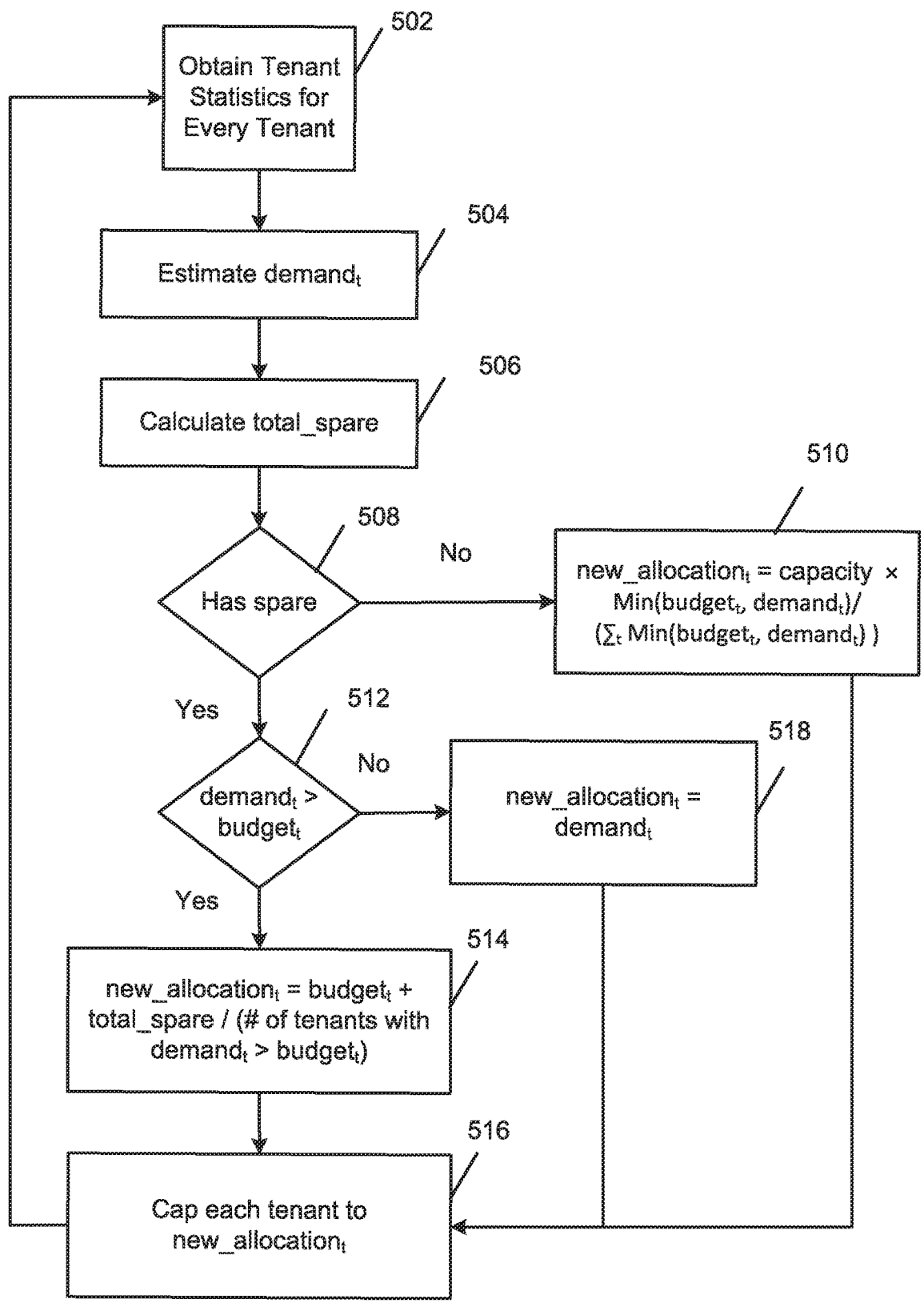
FIG. 5 is a flowchart of an embodiment of memory bandwidth management.

FIG. 5 is a flowchart 500 of an embodiment of memory bandwidth management. For example, FIG. 5 may represent a bandwidth distribution to maximize utilization of the resource. As shown in FIG. 5, at step 502, tenant statistics may be obtained for every tenant.

At step 504, the actual demand is computed for each tenant. The demand is the memory bandwidth a tenant could consume without background traffic. It is estimated based on current usage and background traffic if the tenant is unthrottled. The demand of throttled tenant equals to usage+X where X is a fixed value so as to allocate a higher bandwidth than current usage.

At step 506, total spare capacity may be determined. For example, spare capacity may be determined as $$total\_spare = capacity - \Sigma min(budget_t, demand_t)$$

At step 508, it may be determined whether the system has spare capacity. If not, at step 510, the new allocation is a share of the capacity based on the lower of the tenant budget and demand.

If yes, at step 512, it may be determined whether a tenant's demand is larger than its budget or not. If yes, at step 514, the new allocation may be determined as $$new\_allocation_t = budget_t + total\_spare/(\# \text{ of tenants with demand} > budget)$$

This allocation thus uses a policy of equal distribution of spare capacity; however, other policies may also be used (e.g., proportional to previous usage, priority, etc.). Control is then passed to step 516.

Otherwise, if the tenant's demand is smaller than budget and the system has spare capacity, at step 518, then the new allocation may be determined as $$new\_allocation_t = demand_t$$

At step 516, the tenant memory bandwidth allocation is capped to the $new\_allocation_t$. Control returns to step 502.

Example techniques discussed herein may effectively set controls for limiting an individual core's memory bandwidth usage in a performance- and usage-aware manner. The example techniques may advantageously obtain predictable performance for systems running multiple jobs/tenants while increasing memory bandwidth utilization.

Example techniques discussed herein may advantageously provide per-tenant memory bandwidth control, and may monitor the real-time memory bandwidth consumption of each tenant. Further, the memory bandwidth allocation may be adjusted by setting a throttling knob per CPU core and/or per tenant.

Example techniques discussed herein may advantageously improve memory bandwidth utilization by shifting bandwidth allocation to tenants in need from tenants underutilizing their share. A goal of the shifting includes ensuring that each tenant is provided their guaranteed share of the memory bandwidth, while ensuring that the resource is not idle or underutilized while tenants are active.

Figure 6:
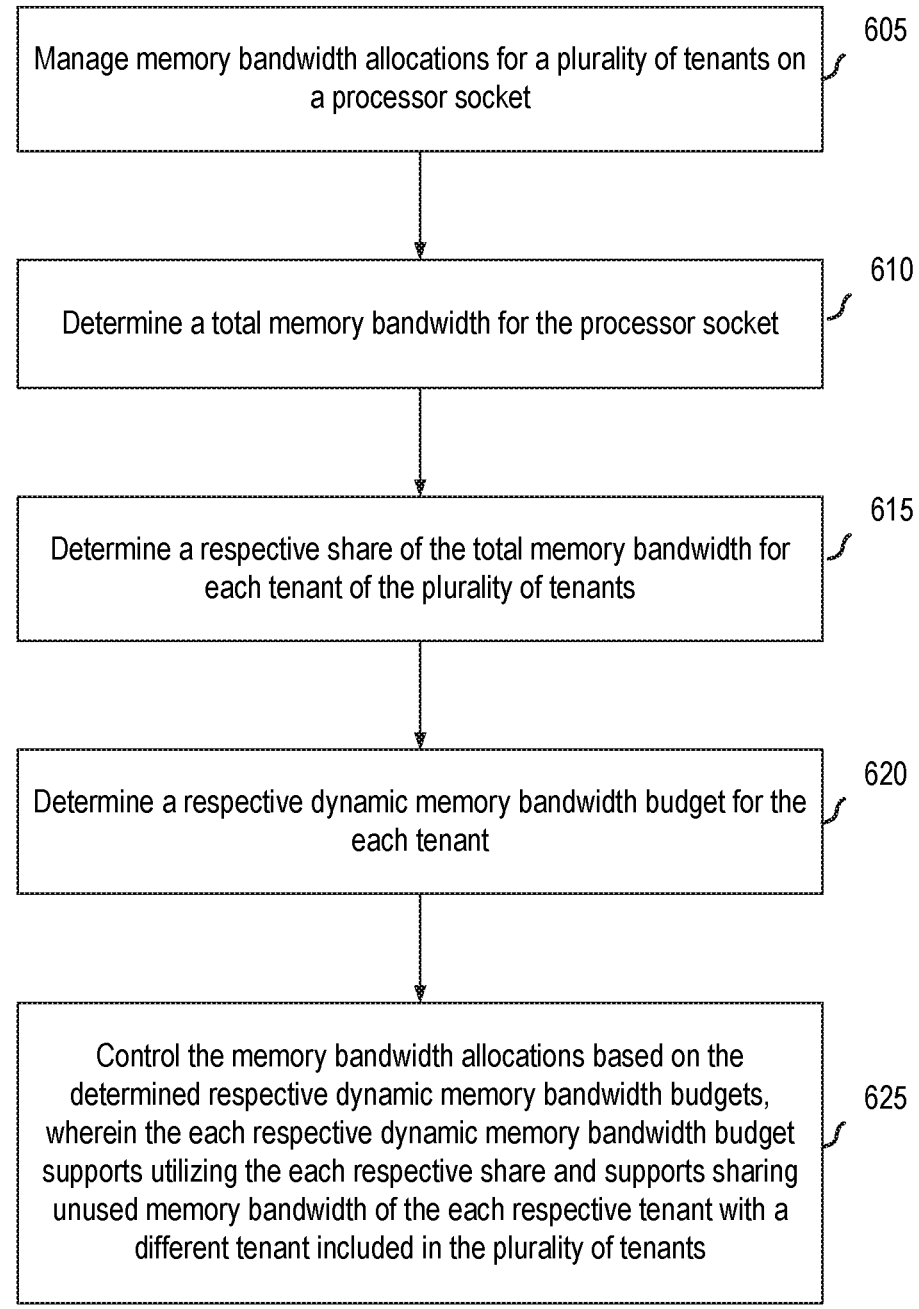
FIG. 6 is a flowchart of an embodiment of memory bandwidth management.

FIG. 6 is a flowchart 600 of an embodiment of memory bandwidth management. As shown in FIG. 6, in step 605, memory bandwidth allocations for a plurality of tenants on a processor socket may be managed. In step 610, a total memory bandwidth for the processor socket may be determined.

In step 615, a respective share of the total memory bandwidth for each tenant of the plurality of tenants may be determined. In step 620, a respective dynamic memory bandwidth budget for the each tenant may be determined.

In step 625, the memory bandwidth allocations may be controlled based on the determined respective dynamic memory bandwidth budgets. The each respective dynamic memory bandwidth budget supports utilizing the each respective share and supports sharing unused memory bandwidth of the each respective tenant with a different tenant included in the plurality of tenants.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
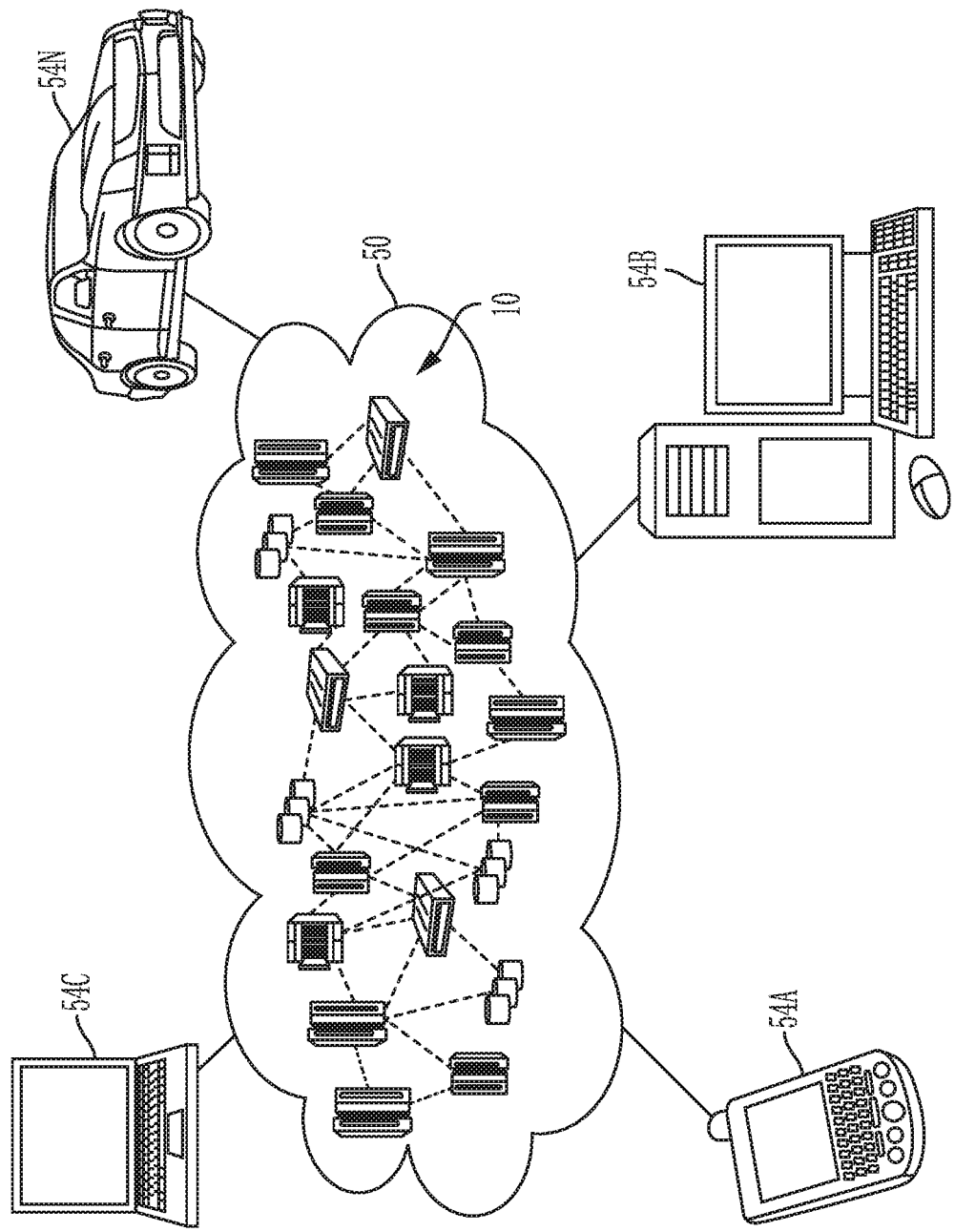
FIG. 7 depicts a cloud computing environment according to an embodiment of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 8:
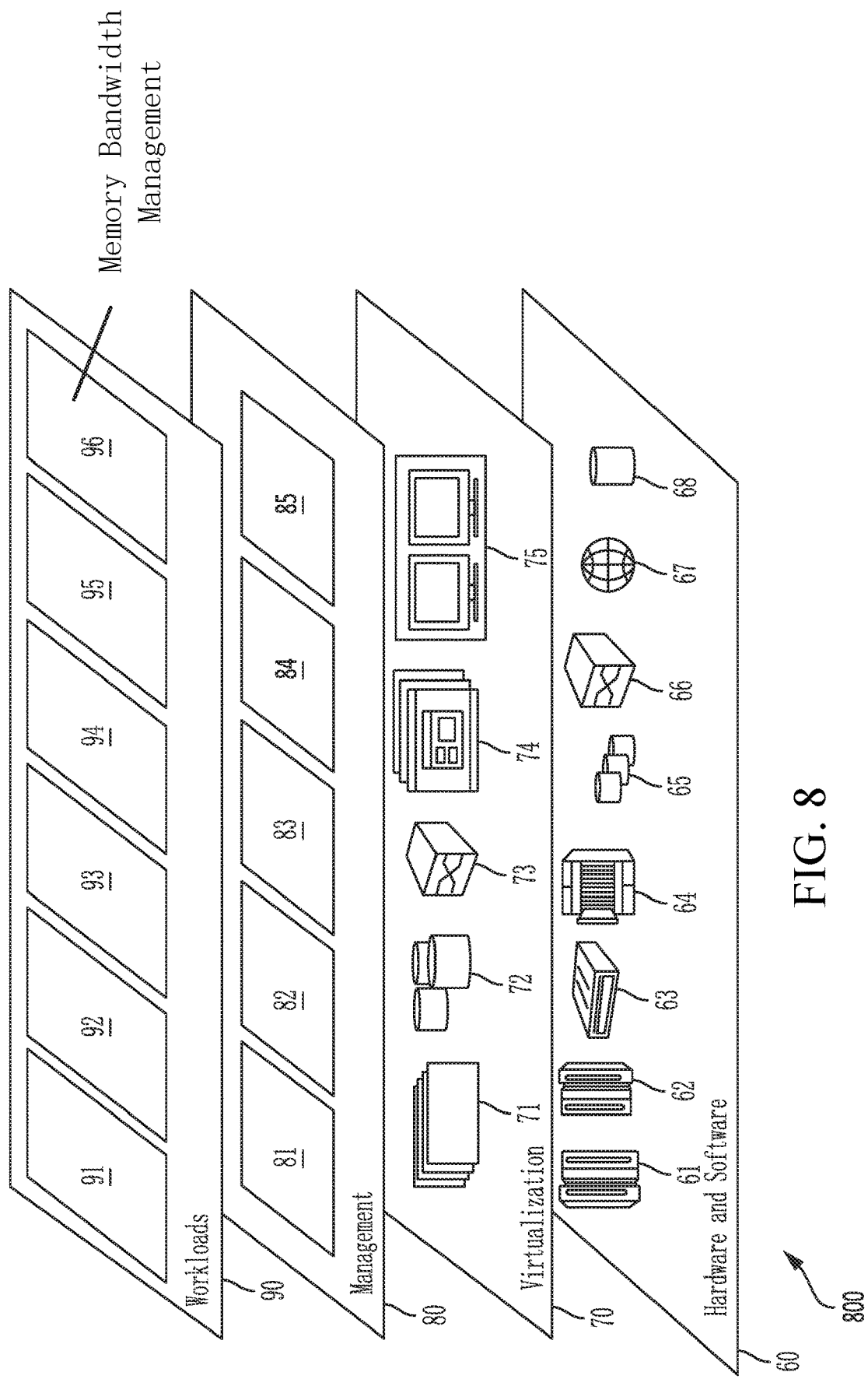
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and memory bandwidth management 96.

The process software for memory bandwidth management is shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 9:
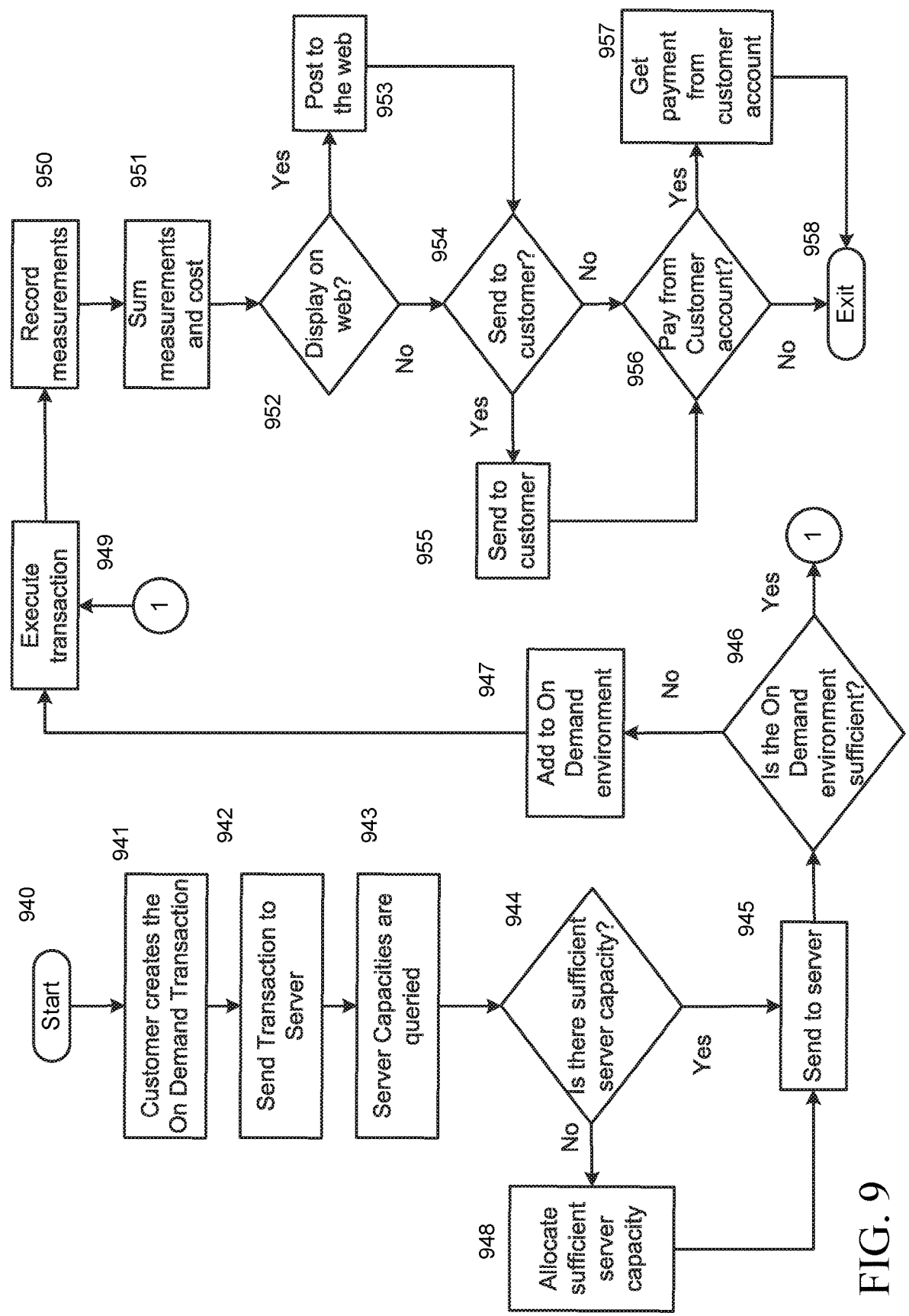
FIG. 9 depicts an on demand service according to an embodiment of the present disclosure.

FIG. 9 depicts an on demand service according to an embodiment. Step 940 begins the On Demand process. A transaction is created that contains the unique customer identification, the requested service type, and any service parameters that further specify the type of service (941). The transaction is then sent to the main server (942). In an On Demand environment, the main server can initially be the only server, and then as capacity is consumed other servers are added to the On Demand environment.

The server central processing unit (CPU) capacities in the On Demand environment are queried (943). The CPU requirement of the transaction is estimated, and then the server's available CPU capacity in the On Demand environment is compared to the transaction CPU requirement to see if there is sufficient CPU available capacity in any server to process the transaction (944). If there is not sufficient server CPU available capacity, then additional server CPU capacity is allocated to process the transaction (948). If there was already sufficient available CPU capacity, then the transaction is sent to a selected server (945).

Before executing the transaction, a check is made of the remaining On Demand environment to determine if the environment has sufficient available capacity for processing the transaction. This environment capacity consists of such things as, but not limited to, network bandwidth, processor memory, storage etc. (946). If there is not sufficient available capacity, then capacity will be added to the On Demand environment (947). Next the required software to process the transaction is accessed, loaded into memory, and then the transaction is executed (949).

The usage measurements are recorded (950). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer (951).

If the customer has requested that the On Demand costs be posted to a web site (952), then they are posted thereto (953). If the customer has requested that the On Demand costs be sent via e-mail to a customer address (954), then they are sent (955). If the customer has requested that the On Demand costs be paid directly from a customer account (956), then payment is received directly from the customer account (957). On Demand process proceeds to 958 and exits.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The Appendix attached hereto is incorporated by reference herein.

What is claimed is:

1. A computer implemented method comprising:
    managing memory bandwidth allocations for a plurality of tenants on a processor socket by:

determining a total memory bandwidth for the processor socket;

determining a respective share of the total memory bandwidth for each tenant of the plurality of tenants;

determining a respective dynamic memory bandwidth budget for the each tenant based at least in part, on a respective memory bandwidth demand associated with executing workloads of the each tenant, and wherein the respective memory bandwidth demand of the each tenant varies among temporal intervals; and controlling the memory bandwidth allocations based on the determined respective dynamic memory bandwidth budgets:

wherein the each respective dynamic memory bandwidth budget supports utilizing the each respective share and supports identifying and sharing spare memory bandwidth of among one or more tenants of the plurality of tenants with a different tenant included in the plurality of tenants that is allocated a respective dynamic memory bandwidth budget less than the respective memory bandwidth demand associated with the different tenant, and wherein controlling the memory bandwidth allocations further includes determining spare memory bandwidth capacity associated with a current temporal interval, based on real-time monitoring and a difference between the total memory bandwidth, a sum of budgets for throttled tenants, and a sum of usage for unthrottled tenants.

2. The computer implemented method of claim 1, wherein an enforcement of a respective dynamic memory bandwidth budget respectively associated with a throttled tenant utilizes throttle controls for adjusting the respective dynamic memory bandwidth budget.

3. The computer implemented method of claim 2, wherein the throttle controls are designated for each processor core used by each throttled tenant.

4. The computer implemented method of claim 1, wherein managing the memory bandwidth allocations for the plurality of tenants on the processor socket includes:

monitoring memory bandwidth utilization for the each tenant to determine a current utilization; and adjusting the throttle controls utilizing an iterative feedback loop.

5. The computer implemented method of claim 1, wherein managing the memory bandwidth allocations for the plurality of tenants on the processor socket is supported on a cloud environment.

6. The computer implemented method of claim 1, wherein managing the memory bandwidth allocations for the plurality of tenants on the processor socket is supported in an Infrastructure as a Service (IaaS) environment.

7. The computer implemented method of claim 1, wherein controlling the memory bandwidth allocations is performed by a daemon in a hypervisor environment.

8. A system comprising:

a device processor; and a computer readable storage medium storing instructions that are executable by the device processor to manage memory bandwidth allocations for a plurality of tenants on a processor socket by:

determining a total memory bandwidth for the processor socket;

determining a respective share of the total memory bandwidth for each tenant of the plurality of tenants;

determining a respective dynamic memory bandwidth budget for the each tenant based, at least in part, on a respective memory bandwidth demand associated with executing workloads of the each tenant, and wherein the respective memory bandwidth demand of the each tenant varies among temporal intervals; and controlling the memory bandwidth allocations based on the determined respective dynamic memory bandwidth budgets;

wherein the each respective dynamic memory bandwidth budget supports utilizing the each respective share and supports identifying and sharing spare memory bandwidth of among one or more tenants of the plurality of tenants with a different tenant included in the plurality of tenants that is allocated a respective dynamic memory bandwidth budget less than the respective memory bandwidth demand associated with the different tenant, and wherein controlling the memory bandwidth allocations further includes determining spare memory bandwidth capacity associated with a current temporal interval, based on real-time monitoring and a difference between the total memory bandwidth, a sum of budgets for throttled tenants, and a sum of usage for unthrottled tenants.

9. The system of claim 8, wherein an enforcement of a respective dynamic memory bandwidth budget respectively associated with a throttled tenant utilizes throttle controls for adjusting the respective dynamic memory bandwidth budget.

10. The system of claim 9, wherein the throttle controls are designated for each processor core used by each throttled tenant.

11. The system of claim 8, wherein managing the memory bandwidth allocations for the plurality of tenants on the processor socket includes:

monitoring memory bandwidth utilization for the each tenant to determine a current utilization; and adjusting the throttle controls utilizing an iterative feedback loop.

12. The system of claim 8, wherein managing the memory bandwidth allocations for the plurality of tenants on the processor socket is supported on a cloud environment.

13. The system of claim 8, wherein managing the memory bandwidth allocations for the plurality of tenants on the processor socket is supported in an Infrastructure as a Service (IaaS) environment.

14. A computer program product comprising a computer readable storage medium storing instructions that are executable by a device processor to manage memory bandwidth allocations for a plurality of tenants on a processor socket by:

determining a total memory bandwidth for the processor socket;

determining a respective share of the total memory bandwidth for each tenant of the plurality of tenants;

determining a respective dynamic memory bandwidth budget for the each tenant based, at least in part, on a respective memory bandwidth demand associated with executing workloads of the each tenant, and wherein the respective memory bandwidth demand of the each tenant varies among temporal intervals; and controlling the memory bandwidth allocations based on the determined respective dynamic memory bandwidth budgets;

wherein the each respective dynamic memory bandwidth budget supports utilizing the each respective share and supports identifying and sharing spare memory bandwidth of among one or more tenants of the plurality of tenants with a different tenant included in the plurality of tenants that is allocated a respective dynamic memory bandwidth budget less than the respective memory bandwidth demand associated with the different tenant, and wherein controlling the memory bandwidth allocations further includes determining spare memory bandwidth capacity associated with a current temporal interval, based on real-time monitoring and a difference between the total memory bandwidth, a sum of budgets for throttled tenants, and a sum of usage for unthrottled tenants.

15. The computer program product of claim 14, wherein an enforcement of a respective dynamic memory bandwidth budget respectively associated with a throttled tenant utilizes throttle controls for adjusting the respective dynamic memory bandwidth budget.

16. The computer program product of claim 15, wherein the throttle controls are designated for each processor core used by each throttled tenant.

17. The computer program product of claim 14, wherein managing the memory bandwidth allocations for the plurality of tenants on the processor socket includes:
  monitoring memory bandwidth utilization for the each tenant to determine a current utilization; and
  adjusting the throttle controls utilizing an iterative feedback loop.

18. The computer program product of claim 14, wherein managing the memory bandwidth allocations for the plurality of tenants on the processor socket is supported in an Infrastructure as a Service (IaaS) environment.

* * * * *